US011023724B2

(12) United States Patent
Rostand et al.

(10) Patent No.: US 11,023,724 B2
(45) Date of Patent: Jun. 1, 2021

(54) METHOD AND SYSTEM FOR DETERMINING A STATUS OF A HYDROCARBON PRODUCTION SITE

(71) Applicant: KAYRROS, Paris (FR)

(72) Inventors: Antoine Henri Marie Rostand, Paris (FR); Luc François Marle Mercereau, Paris (FR); Oliver Ge Zhu, Paris (FR); Clément Michel Guy Giron, Paris (FR); Brice Stéphane Michel Legrand, Paris (FR); Vincent Etienne Chabot, Paris (FR)

(73) Assignee: KAYRROS, Paris (FR)

( * ) Notice: Subject to any disclaimer, the term of this patent is extended or adjusted under 35 U.S.C. 154(b) by 90 days.

(21) Appl. No.: 16/441,923

(22) Filed: Jun. 14, 2019

(65) Prior Publication Data

US 2019/0384975 A1    Dec. 19, 2019

Related U.S. Application Data

(60) Provisional application No. 62/685,130, filed on Jun. 14, 2018.

(51) Int. Cl.
  *G06K 9/00* (2006.01)
  *G06T 7/11* (2017.01)
  *G06T 7/143* (2017.01)

(52) U.S. Cl.
  CPC ............ *G06K 9/00637* (2013.01); *G06T 7/11* (2017.01); *G06T 7/143* (2017.01); *G06T 2207/20081* (2013.01); *G06T 2207/20084* (2013.01); *G06T 2207/30184* (2013.01)

(58) Field of Classification Search
  CPC ............... G06K 9/00637; G06T 7/11; G06T 2207/30184; G06T 2207/20081; G06T 2207/20084; G06T 7/143
  See application file for complete search history.

(56) References Cited

U.S. PATENT DOCUMENTS

| | | | |
|---|---|---|---|
| 2014/0195454 A1* | 7/2014 | Richie | G06Q 10/0833 705/333 |
| 2014/0344301 A1* | 11/2014 | McDonough | G06Q 50/02 707/758 |
| 2015/0315897 A1* | 11/2015 | Samuel | E21B 47/002 702/9 |
| 2016/0069182 A1* | 3/2016 | Neale | E21B 47/16 166/254.2 |

(Continued)

*Primary Examiner* — Kevin Ky
(74) *Attorney, Agent, or Firm* — Foley & Lardner LLP; Sunit Talapatra

(57) ABSTRACT

Methods and systems for determining a status of a hydrocarbon production site are provided. The systems and methods include defining an area about a hydrocarbon well location and obtaining a time series of mobile geolocation data for at least one mobile device located within the area about the hydrocarbon well location. The times series of mobile geolocation data is processed and probabilities that the mobile geolocation data is associated with a drilling activity, a fracking activity, a tie-in activity, and/or an absence of drilling activity, fracking activity, and/or tie-in activity are output. The mobile geolocation data is categorized, based on the probabilities, as being associated with one of drilling activity, fracking activity, or absence of drilling activity and fracking activity.

10 Claims, 6 Drawing Sheets

(56) References Cited

U.S. PATENT DOCUMENTS

2016/0273314 A1* 9/2016 Tanuma ................ G06Q 50/02
2017/0364795 A1* 12/2017 Anderson ............. G06N 20/10
2018/0137355 A1 5/2018 Rostand
2018/0217285 A1* 8/2018 Walters ................ G01V 1/301
2018/0336693 A1 11/2018 De Franchis

* cited by examiner

METHOD AND SYSTEM FOR DETERMINING A STATUS OF A HYDROCARBON PRODUCTION SITE

CROSS-REFERENCE TO RELATED APPLICATIONS

The present application claims priority to U.S. Provisional Application No. 62/685,130 filed on Jun. 14, 2018, the entire disclosure of which is incorporated herein by reference.

TECHNICAL FIELD

The disclosure, in various embodiments, relates generally to a method and system for tracking (e.g., monitoring) hydrocarbon, including oil and gas, production activity. More particularly, this disclosure relates to using mobile geolocation data to determining a status of a hydrocarbon production site.

BACKGROUND

Prior to production of oil and gas from a well, several steps are required to bring a well online. In the USA, a permit for drilling must be issued first. This permit gives the operator permission to drill at a particular location prior to an expiration date. In order to proceed with the subsequent steps, a well pad is then constructed at the permitted location to enable the use of heavy machinery. A rig is then mobilized on the well pad and is used to drill the well. In unconventional wells, a step of hydraulic fracturing, also known in the art as fracking, may be employed to increase production of hydrocarbons from the well. Both drilling and fracking activity have a timescale ranging from a few days to several weeks and involve heavy machinery.

Knowing exactly when a well is drilled and/or fracked is a key factor to estimate a given well's production time series. The dates on which drilling activity and fracking activity began and ended are self-reported by the well owners or other parties. These dates are publicly available through various permitting authorities that maintain databases and through various organizations that aggregate data from these databases. However, reporting may be delayed relative to the dates on which the drilling and fracking activity occurred. Such delay may be on the order of days to months. Further, the official databases containing the reports of permitting, drilling, and fracking activity are lagged. This lag can sometimes exceed a year for some well locations. Accordingly, there is a need for obtaining the start and end dates of at least drilling and fracking activity closer in time to the date on which such activity occurs.

SUMMARY

In some embodiments, a method for determining a status of a hydrocarbon production site comprises defining an area about a hydrocarbon well location, obtaining a time series of mobile geolocation data for at least one mobile device located within the area about the hydrocarbon well location, processing the time series of mobile geolocation data and outputting a probability that the mobile geolocation data is associated with a drilling activity, a probability that the mobile geolocation data is associated with a fracking activity, and a probability that the mobile geolocation data is associated with an absence of drilling activity and fracking activity. Based on the probabilities, the mobile geolocation data is categorized as being associated with one of drilling activity, fracking activity, or absence of drilling activity and fracking activity.

In other embodiments, a method for determining a status of a hydrocarbon production site comprises defining an area about a hydrocarbon well location, obtaining a time series of mobile geolocation data for at least one mobile device located within the area about the hydrocarbon well location, and processing the time series of mobile geolocation data and outputting a probability that the mobile geolocation data is associated with a tie-in activity or a probability that the mobile geolocation data is associated with an absence of tie-in activity. Based on the probabilities, the mobile geolocation data is categorized as being associated with one of tie-in activity or absence of tie-in activity.

A system for determining a status of a hydrocarbon production site comprises a memory storing a time series of mobile geolocation data for at least one mobile device located within an area about a hydrocarbon well location. The system further comprises a processor communicatively coupled to the memory. The processor is configured to process the time series of mobile geolocation data obtained from the memory, calculate a probability that the mobile geolocation data is associated with a drilling activity and with a probability that the mobile geolocation data is associated with an absence of drilling activity, and categorize the mobile geolocation data as being associated with one of drilling activity or absence of drilling activity.

DETAILED DESCRIPTION

Figure 1:
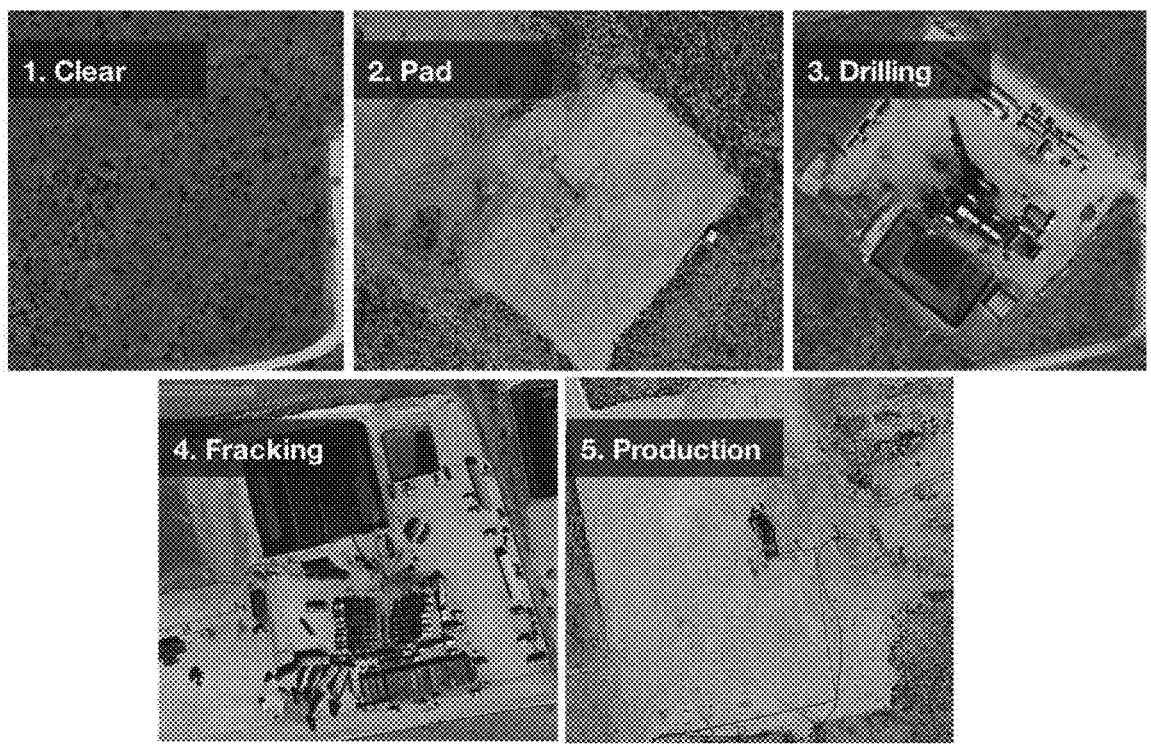
FIG. 1 illustrates optical images of phases of hydrocarbon production at a well location.

The illustrations presented herein are not actual views of any particular component, device, or system, but are merely idealized representations employed to describe example embodiments of the present disclosure. The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, only those process acts and systems necessary to understand the embodiments of the disclosure are described in detail below. Additional conventional acts and systems may be used. Also note, any drawings accompanying the application are for illustrative purposes only, and are thus not drawn to scale. Additionally, elements common between figures may have corresponding numerical designations.

As used herein, the terms "comprising," "including," "containing," "characterized by," and grammatical equivalents thereof are inclusive or open-ended terms that do not exclude additional, un-recited elements or method steps, but also include the more restrictive terms "consisting of," "consisting essentially of," and grammatical equivalents thereof.

As used herein, the term "may" with respect to a system, structure, feature, or method act indicates that such is contemplated for use in implementation of an embodiment of the disclosure, and such term is used in preference to the more restrictive term "is" so as to avoid any implication that other compatible systems, structures, features, and methods usable in combination therewith should or must be excluded.

As used herein, the singular forms following "a," "an," and "the" are intended to include the plural forms as well, unless the context clearly indicates otherwise.

As used herein, the term "and/or" includes any and all combinations of one or more of the associated listed items.

As previously disclosed, hydrocarbon production, such as oil and gas production, generally proceeds through a plurality of steps, which are also referred to herein as stages or phases, common to substantially all hydrocarbon production processes. These stages may include permitting, clearing, well pad construction, drilling, hydraulic fracturing, tie-in, and production. Permitting may be detected by the issuance of a drilling permit. The issuance of a drilling permit is generally publicly available information. Information relating to the issuance of the drilling permit, including the owner and/or operator of the future well (e.g., the to be drilled well or the to be fracked well), the well type, the API well number or other identifier, the expiration date of the permit, the geographic location of the future well, and the like, is also generally publicly available information. As previously discussed, the phases of well pad construction, drilling, hydraulic fracturing, tie-in, and production may be detected through research of databases. However, the phases of clearing, well pad construction, drilling, hydraulic fracturing, tie-in, and production may also be visually detected. Aerial images of a clearing phase, well pad construction phase, drilling phase, fracking phase, and production phase are shown respectively in FIG. 1. Accordingly, images of a location of hydrocarbon production can be analyzed to determine what stage of hydrocarbon production is taking place at a given point in time.

During the well drilling phase, equipment such as a drilling rig, a fluid pit including water, mud, and/or drilling fluid, casing pipe, crew vehicles, and the like are visible on the well pad as illustrated in FIG. 1. Crew members to operate the foregoing equipment are also present at the well location.

During the fracking phase, equipment such as trucks and/or tanks for delivering and storing fracturing fluid, trucks and/or tanks for delivering and storing water, sand, and/or fracking fluid/chemicals, frac pumps, wellheads, data monitoring vehicles, frac blenders, crew vehicles, and the like are visible on the well pad as illustrated in FIG. 1. Crew members to operate the foregoing equipment are also present at the well location.

After the optional fracking phase, the well that has been drilled or fracked is considered complete. After the well is completed, the well must be prepared for production or brought online. For example, coiled tubing or other production tubing may be provided within the well to draw out hydrocarbons. The tubing may be further assembled with a production string. Equipment such as trucks for delivering and installing the production equipment are visible on the well pad during a phase referred to herein as the tie-in phase. As used herein, the tie-in phase may be used to refer to the final stage of work to be completed on a well that has been previously drilled or fracked to prepare the well for extracting hydrocarbons. Crew members to operate the foregoing equipment are also present at the well location.

Figure 6:
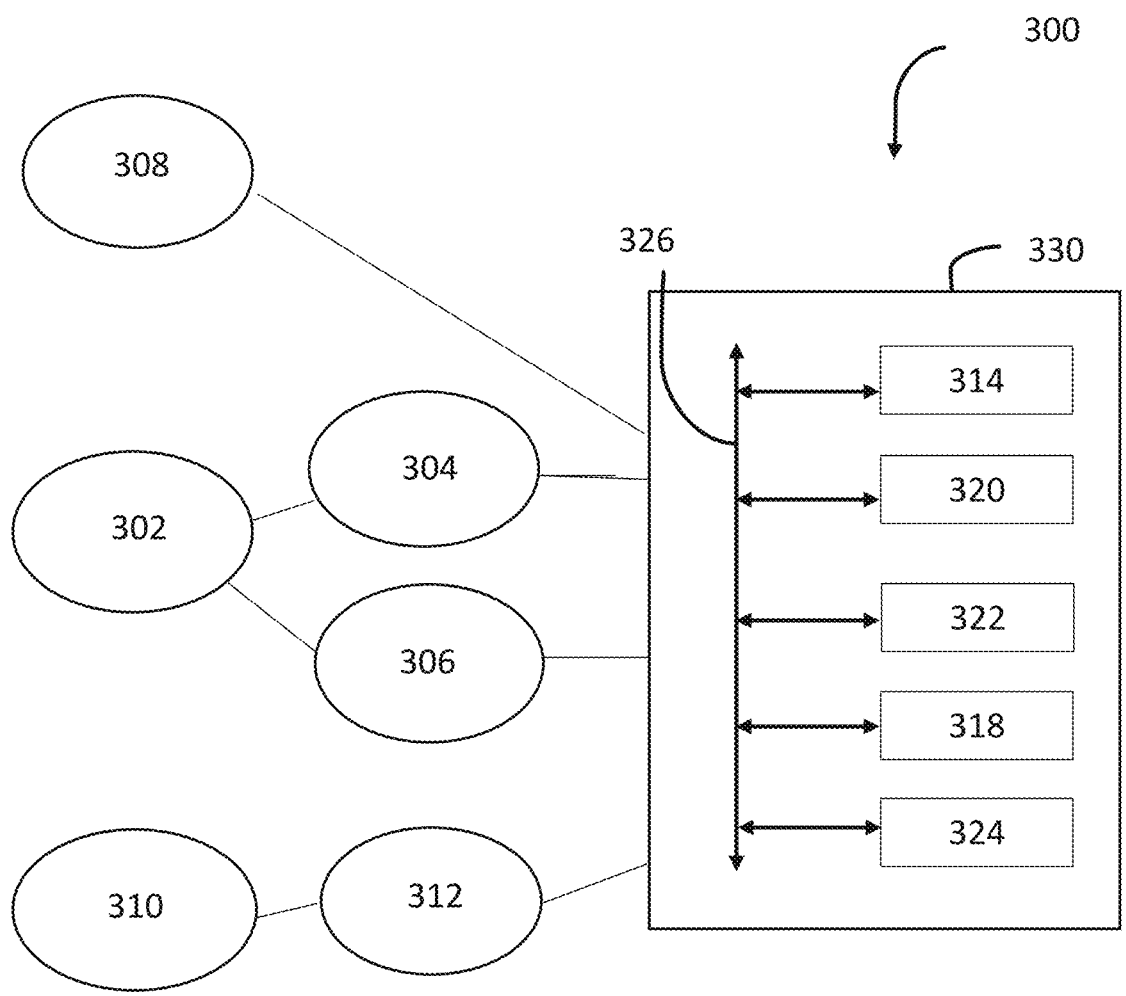
FIG. 6 is a schematic diagram of the general architecture of a system according to embodiments the present disclosure.

The foregoing equipment may be visible by image acquisition devices 302 illustrated in the system 300 of FIG. 6. The image acquisition devices 302 may include satellites, planes, unmanned aerial vehicles (UAVs) or drones, and other aerial imaging systems. The image acquisition devices 302 may use photographic (e.g., optical) sensors or radar sensors. The image acquisition devices 302 may produce optical images or radar images. The presence or absence of the foregoing equipment may be indicative of a phase of hydrocarbon production in progress. Optical and radar images may be obtained from databases 304, 306 including, but not limited to, WorldView-1/2/3/4, GeoEye, QuickBird, Pleiades-1A/B, Spot-6/7, Kompsat-3/3A, RapidEye, Planet Doves, Planet SkySats, Sentinel-2, Landsat-7/8 and radar images from TerraSAR-X/TanDEM-X, COSMO-SkyMed, RadarSat-1/2, Kompsat-5, Alos-2, Sentinel-1, Capella, IceEye or UmbraLabs.

Figure 2:
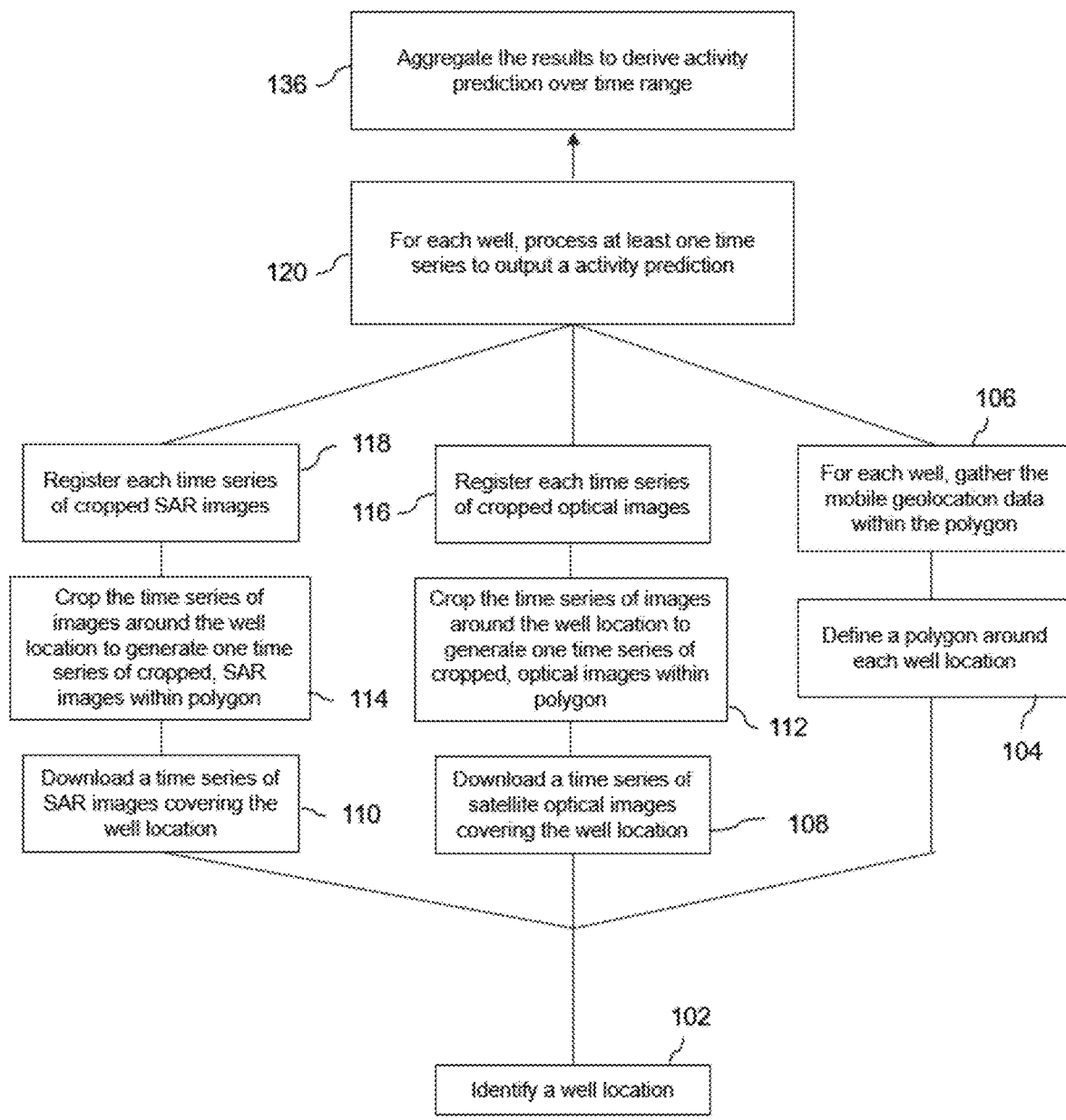
FIG. 2 schematically illustrates a flowchart of a method of according to at least one embodiment of the present disclosure.

The presence or absence of crew members may be detected using mobile geolocation data as discussed in further detail herein. To monitor activity occurring at a well location or to determine a status of the well location, mobile geolocation data may be collected (e.g., obtained, retrieved, received) and processed (e.g., analyzed) as discussed with reference to FIG. 2. Alternatively or additionally, at least one image from an image acquisition device and may be collected and processed with the mobile geolocation data. FIG. 2 is a flowchart 100 showing the steps to monitor activity or to determine a status of activity and, more particularly, hydrocarbon production-related activity.

In step 102 of the flowchart 100, an area of interest (AOI) for determining activity is identified. AOI refers to a geographic area in which at least one well location is located. The well location may be selected from a database of drilling permits 308 (FIG. 6). For example, in the USA, a database of drilling permits is publicly available. The drilling permit provides the geographic location including the geographic coordinates of the well location. The well location may be a future well location, which refers to a well that is to be drilled and/or to be fracked. Alternatively or additionally, the well location may be a completed well location, which refers to a well that has been previously drilled and/or fracked such that the well is ready for production or in production.

Figure 8:
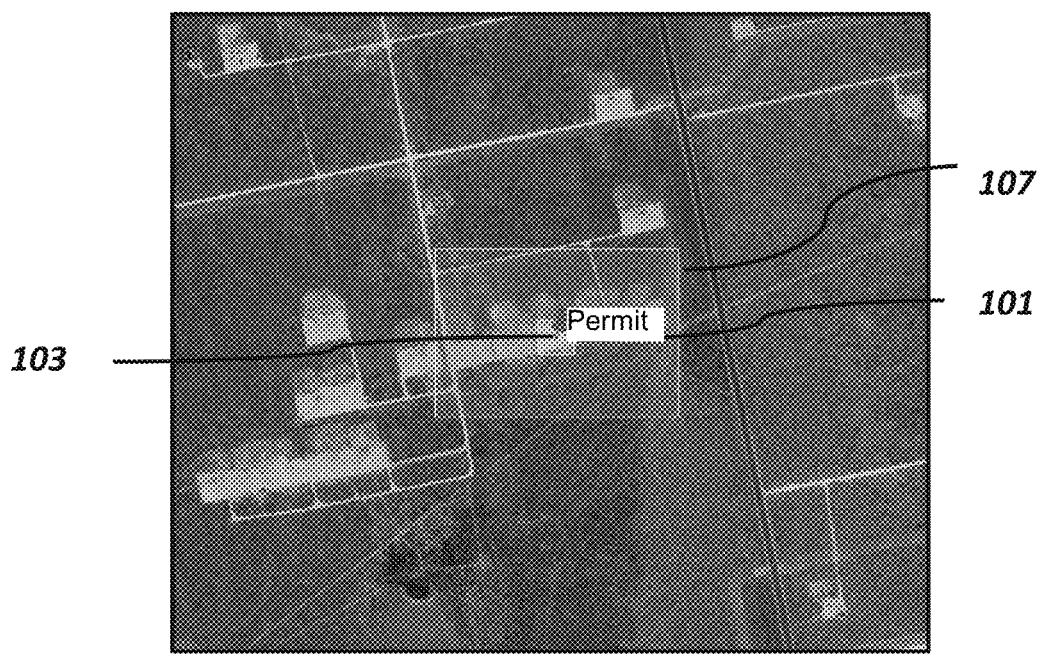
FIG. 8 depicts an exemplary optical image of a well location according to at least one embodiment of the present disclosure.

In step 104, a boundary is defined about the well location. FIG. 8 illustrates an exemplary bounded region 101 about a permitted well location 103. In some embodiments, the bounded region 101 has a predefined shape, such as a circle or polygon, that is centered about a permitted well location 103. In other embodiments, a well pad including the well location may be manually segmented. In yet further embodiments, a well pad including the well location may be automatically segmented using an image-based segmentation algorithm. In further embodiments, the AOI may refer to a geographic area in which water, sand, fracking fluid/chemicals or other supplies and equipment needed in the well drilling and/or well fracking process are obtained and transported to a well location. Accordingly, more than one AOI may be monitored over the same or otherwise overlapping period of time.

In step 106, a time series of mobile geolocation data within the area about the well location is obtained. As used herein, mobile geolocation data refers to the identification or estimation of a geographic location of at least one mobile device. As used herein, mobile device refers to a device made for portability from which a geographic location may be derived. The geographic location may be derived from global positioning systems, cellular networks, internet protocol addresses, or any other system usable to identify the longitudinal and latitudinal coordinates of a mobile device 310 (FIG. 6). By way of example and not limitation, mobile devices include cell phones, smartphones, PDAs, watches, wearable devices, tablets, laptops, personal computers, and fleet tracking devices. The mobile geolocation data may be obtained from a database 312 (FIG. 6) of pseudonymised mobile device information. Pseudonymised mobile device information refers to information relating to a mobile device that cannot lead to the direct identification of a specific individual. Accordingly, the pseudonymized mobile device information obtained includes the longitudinal and latitudinal coordinates and accompanying timestamps of the mobile device(s) but does not include name, address, and/or phone number related to the mobile device(s).

Figure 3:
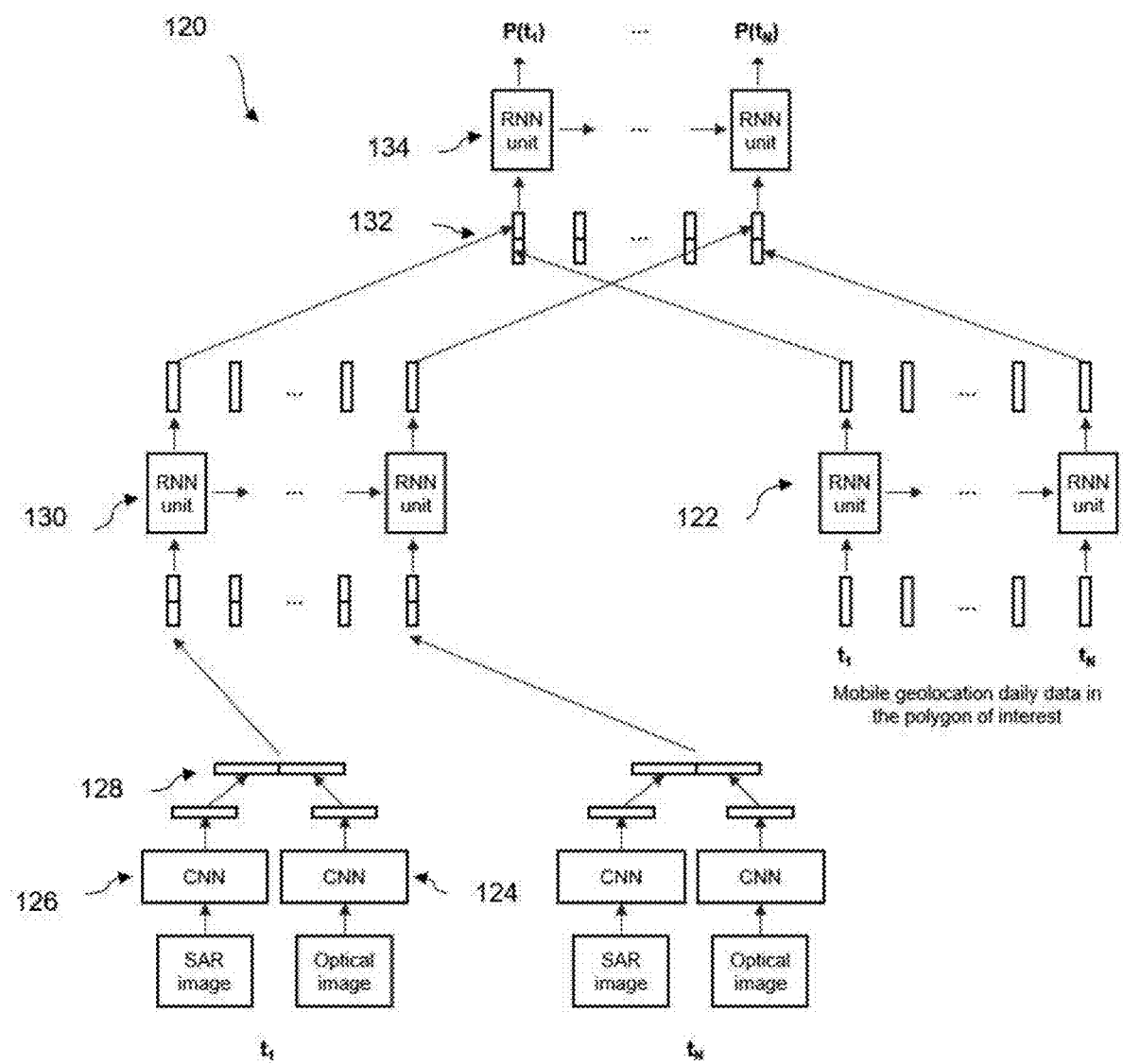
FIG. 3 schematically illustrates a flowchart of a method of according to at least one embodiment of the present disclosure.

The time series of mobile geolocation data may also include a pseudonymised identifier for each device present within the bounded region 101 between a first date of the time series, $T_1$ (FIG. 3), and a last date of the time series, $T_N$ (FIG. 3). From the times series of mobile geolocation data, a number of pseudonymised identifiers located within the area about the well location may be determined on a given day or other period of time, $T_T$, of the time series.

Figure 5:
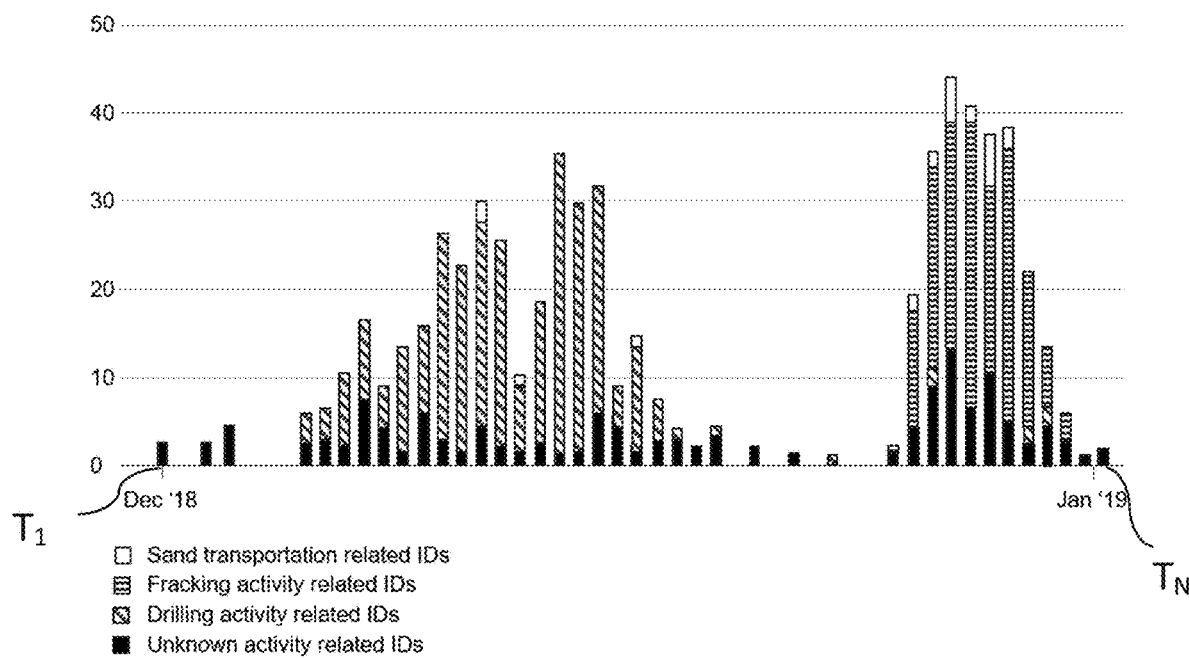
FIG. 5 is a graphic representation illustrating mobile geolocation data inputs according to embodiments of the present disclosure.

Each pseudonymised identifier may tagged to (e.g., associated with) a hydrocarbon production activity. The categories for tagging the pseudonymised identifiers may include drilling activity, fracking activity, sand transportation activity, tie-in activity, production activity, and/or an absence of one or more of the foregoing activities. As illustrated in FIG. 5, the pseudonymised identifiers may be categorized as fracking activity related IDs, drilling activity related IDs, sand transportation related IDs, and/or unknown activity related IDs. In some embodiments, mobile geolocation data from a previously drilled, fracked, or completed well for which a start date and an end date of the drilling, fracking, and/or tie-in phases has been previously reported in a database may be obtained. Based on the start date and the end date of these phases, the pseudonymised identifiers present in the time range of the drilling phase, the fracking phase, and/or the tie-in phase may be associated with the respective phase classifications. As described in further detail below, the method of the present disclosure includes a determination of a start date and an end date of the drilling stage, the fracking stage, and/or the tie-in stage. The category with which a pseudonymised identifier is tagged may be modified based on a determination of the present method that the pseudonymised identifier was present during a drilling stage, fracking phase, or tie-in phase. Alternatively or additionally, more than one AOI may be monitored as previously discussed. In such embodiments, a pseudonymised identifier may be present in more than one monitored AOI. By way of non-limiting example, a sandmine from which sand used in during fracking is retrieved may be a monitored AOI. Pseudonymised identifier(s) located in the sandmine AOI may be associated with a sand transportation.

Figure 7:
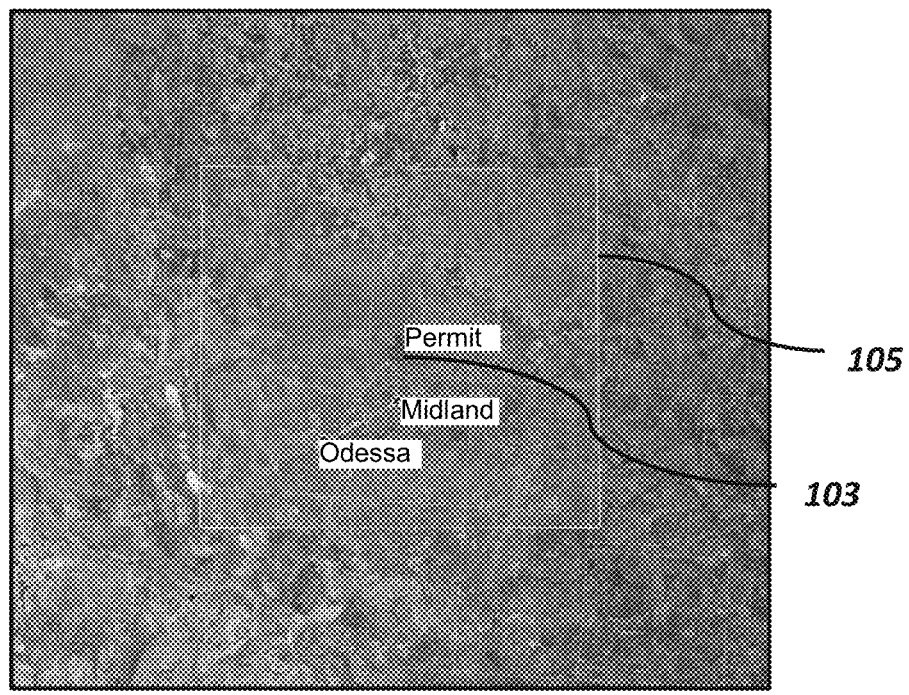
FIG. 7 depicts an exemplary optical image of a well location according to at least one embodiment of the present disclosure.

In step 108, a first time series of images depicting the AOI is obtained. The first time series of images includes optical images available from a database. FIG. 7 is an exemplary optical image of the first times series of images. In step 110, a second time series of images depicting the AOI is obtained. The second time series of images includes radar images. The optical and radar images are obtained over a time range beginning with a time $T_1$, which denotes a first time for which image data is available and for which analysis of the image data to track a status of a well is desired, and ends at time $T_N$, which denotes a last time for which image data is available and for which analysis of the image data to track a status of a well is desired.

In some embodiments, one or more images of the first and second time series may be pre-processed and cropped in steps 112 and 114, respectively. As illustrated in FIG. 7, the optical image obtained in step 108 includes the permitted well location 103 and a large area 105 about the permitted well location 103. In some embodiments, the majority of the area about the permitted well location 103 is irrelevant to the analysis of the present disclosure. Accordingly, the images of the first and second time series obtained in steps 108 and 110 may be pre-processed and cropped to remove extraneous portions of the images and focus the images of the permitted well location 103 of interest. By way of non-limiting example, the images may be pre-processed and cropped according to a method as described in U.S. application Ser. No. 15/983,493, filed May 18, 2018, the entire disclosure of which is incorporated herein by this reference. As illustrated in FIG. 8, the cropped optical images 107 are focused on the same well location 103 for which mobile geolocation data is obtained. Accordingly, the cropped images of steps 112 and 114 include the bounded region 101 of the mobile geolocation data. However, the area about the well location 103 depicted in the images may be different from, such as larger than, the area about the well location 103 included in the bounded region 101 as illustrated in FIG. 8. In steps 116 and 118, the images are registered against one another.

At step 120, the cropped images and/or the mobile geolocation data are processed at a computing device 330 (FIG. 6) to output an activity prediction in step 136. The activity prediction refers to a categorization of the cropped images and/or the mobile geolocation data within at least one stage of hydrocarbon production activity. The stages of hydrocarbon production activity according to embodiments of the present disclosure include one or more of a drilling activity, a fracking activity, a tie-in activity, and an absence of drilling activity, fracking activity, and/or tie-in activity at the well location. The absence of drilling activity, fracking activity, and/or tie-in activity includes periods of inactivity at the well location. The absence of drilling activity, fracking activity, and/or tie-in activity also includes activity relating to other stages of hydrocarbon production activity such as clearing, well pad construction, and hydrocarbon production.

By way of example and not limitation, for analysis of a conventional well, the stages of hydrocarbon production activity may include a drilling activity, a tie-in activity, and an absence of drilling activity and tie-in activity. For analysis of an unconventional well, the stages of hydrocarbon production activity may include a drilling activity, a fracking activity, a tie-in activity, and/or an absence of drilling activity, fracking activity, and/or tie-in activity. Further, for either analysis of a conventional well or an unconventional well, analysis of only one stage of hydrocarbon production activity such as one of drilling activity, fracking activity, or tie-in activity, may be performed.

The processing that occurs in step 120 is illustrated in FIG. 3 and may employ the computing device 314. While step 120 is illustrated in FIG. 3 as processing each of the radar images, the optical images, and the mobile geolocation data, embodiments of the present disclosure include processing of at least one (e.g., one, two, each) of the radar images, the optical images, and the mobile geolocation data.

With continued reference to FIG. 3, in step 122, a computing device is used to extract feature vectors from the time series of mobile geolocation data. FIG. 5 illustrates a graphical representation of the time series of mobile geolocation data input in step 122. The time series begins at time $T_1$, which denotes a first time (e.g., date) for which mobile geolocation data is available and for which analysis of the mobile geolocation data to track a status of a well is desired, and ends at time $T_N$, which denotes a last time for which mobile geolocation data is available and for which analysis of the mobile geolocation data to determine a status of a well is desired. As illustrated in FIG. 5, the times series of mobile geolocation data includes the total (e.g., aggregated) number of pseudonymised identifier(s) (plotted on they axis), which is indicative of a number of mobile devices, identified as being located within the area about the well location on a given date (plotted on the x axis). The times series of mobile geolocation data also includes the total number of pseudonymized identifier(s) per category of hydrocarbon production activity identified as being located within the area about the well location on a given date such that an association of each pseudonymized identifier with a prior drilling activity, a prior fracking activity, a prior tie-in activity, and/or a prior absence of drilling activity, fracking activity, and/or tie-in activity is input.

The computing device encodes information contained in the mobile geolocation data relating to features of at least one hydrocarbon production activity including a drilling activity, a fracking activity, a tie-in activity, and an absence of drilling, fracking, and/or tie-in activity. The mobile geolocation data is processed as a function of time from time $T_1$ to time $T_N$. By way of non-limiting example, the mobile geolocation data may be processed as a function of the date on which the mobile geolocation data was obtained. The feature vectors extracted in step 122 are representative of the mobile geolocation data including a context layer. The context layer includes information pertaining to mobile geolocation data at time $T_T$, which is between time $T_1$ and $T_N$, relative to mobile geolocation data obtained before time $T_T$ and after time $T_T$. Step 122 may be performed through analysis of the mobile geolocation data using a machine learning algorithm. The machine learning algorithm may be a recurrent neural network as illustrated in FIG. 3. In other embodiments, the machine learning algorithm may be a concurrent neural network.

With regard to the cropped first time series of images, a computing device is used to encode the cropped first time series of images in step 124. More particularly, the computing device encodes information contained in the images, such as the presence and/or absence of visually detectable features of one of a drilling activity, a fracking activity, tie-in activity, or an absence of drilling activity, fracking activity, and/or tie-in activity. In step 124, each image of the cropped first time series of images may be processed independently (e.g., individually). The images may be processed as a function of the time from time $T_1$ to time $T_N$ on which the image was received. Feature vectors representative of the optical image are output from step 124. With regard to the cropped second time series of images, a computing device is used to encode the cropped second time series of images in step 126. Similar to step 124, each image of the cropped second time series encodes information contained in the radar images related to features of one of a drilling activity, a fracking activity, tie-in activity, and an absence of drilling activity, fracking activity, and/or tie-in activity. In step 126, feature vectors representative of the radar image are output.

Steps 124 and 126 may be performed through analysis of the image using a machine learning algorithm. The machine learning algorithm is trained to recognize the features of one of a drilling activity, a fracking activity, tie-in activity, and an absence of drilling activity, fracking activity, and/or tie-in activity. The machine learning algorithm may be at least one of Histogram of gradients with Linear model, Support Vector Machine, K-Nearest neighbor's algorithm, Random Forests, Support Vector Machine with kernel, Support Vector Machine without kernel, Neural Networks, Convolutional Neural networks a convolutional neural network (CNN). As illustrated in FIG. 3, the machine learning algorithm is a CNN.

In step 128, the feature vectors output at steps 124 and 126 are concatenated. The feature vectors output at steps 124 and 126 and concatenated in step 128 are for images of the same time $T_N$ within the time series. The concatenated feature vector is representative of the radar and optical image. In step 130, a computing device is used to encode the concatenated feature vectors with a context layer. The context layer includes information pertaining to the image data at time $T_T$, which is between time $T_1$ and $T_N$, relative to image data obtained before time $T_T$ and after time $T_T$. As previously disclosed, more than one optical image and more than one radar image is obtained and processed. In step 130, a feature vector representative of the radar image and the optical image including information representative of radar and optical images that came before the present image and/or images coming after the present image is output. Step 130 may be performed through analysis of the images using a machine learning algorithm. As illustrated in FIG. 3, the machine learning algorithm is a recurrent neural network (RNN). More particularly, the recurrent neural network may be a bidirectional long short-term memory (bi-LSTM) network. In other embodiments, a convolutional neural network may be used in step 130.

In step 132, the feature vector of step 122 and the feature vector of step 130 that correspond to the same time $T_T$ within the time series are concatenated. In step 134, a computing device is used to calculate at least one probability that the concatenated features vector of step 132 is representative of a drilling activity, a fracking activity, a tie-in activity, or an absence of drilling activity, fracking activity, and/or tie-in activity at a particular time. Step 134 may be performed through analysis of the feature vectors using a machine learning algorithm. The machine learning algorithm is a recurrent neural network (RNN). A SoftMax function is applied in step 134 such that the probability or probabilities have a percentage value extending in a range from 0 to 100. In step 136 (FIG. 2), the mobile geolocation data and/or the image data are classified as representative of a single activity category being the activity category with the highest calculated probability. A single activity category is identified for each image date or mobile geolocation date.

Figure 4:
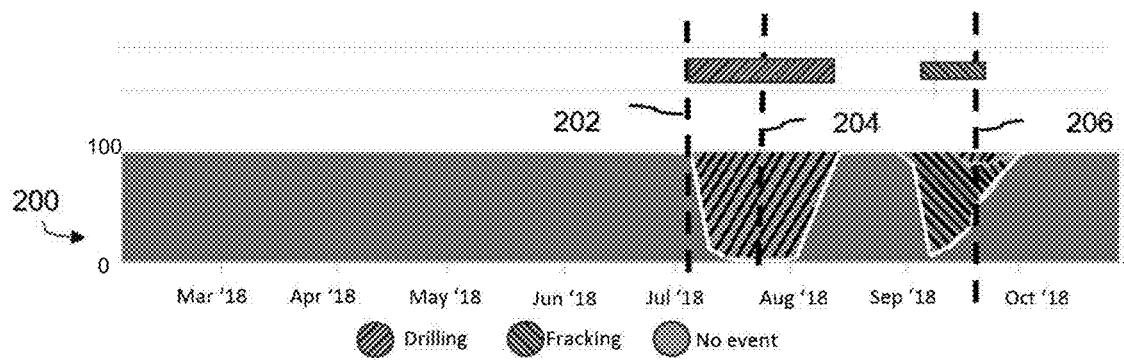
FIG. 4 includes graphic representations of the probabilities and categories determined in the method of the present disclosure.

A visual representation of steps 134 and 136 are shown in FIG. 4. FIG. 4 is a graph 200 plotting probabilities on the y axis and time on the x axis and a ground truth classification of the plotted probabilities. In some embodiments, the visual representation of FIG. 4 may be displayed at an I/O interface 318. As illustrated in FIG. 4, at the time indicated by line 202, a probability that the mobile geolocation data and the image data is representative of fracking activity is 0 and a probability that the mobile geolocation data and the image data is representative of absence of drilling and fracking activity is greater than a probability that the mobile geolocation data and the image data is representative of drilling activity. Accordingly, the mobile geolocation data and the image data are classified as being representative of absence of drilling and fracking activity within the AOI. At the time indicated by line 204, the probability that the mobile geolocation data and the image data is representative of drilling activity is 100 while the probabilities that the mobile geolocation data and the image data is representative of fracking activity or the absence of drilling and fracking activity are each zero. Accordingly, the mobile geolocation data and the image data is classified at time 204 as drilling activity. The classification of drilling activity is plotted on the ground truth plot. By way of further example, at the time indicated by line 206, the probabilities of drilling activity and fracking activity are each less than the probability of absence of drilling and fracking activity. Accordingly, the mobile geolocation data and the image data is classified at time 206 as absence of drilling and fracking activity.

In step 136, the status of the area about the well is aggregated over a range of dates. From the aggregated statuses, a start date and an end date for each stage of hydrocarbon production including, but not limited to, a drilling phase, a fracking phase, and/or a tie-in phase can be determined. Based on the start and/or end dates of the earlier phase, start dates of later phases of hydrocarbon production may be predicted. For example, the end date of a fracking phase or the end date of a tie-in phase may be relied upon to predict a start date of a production phase. The start and end dates of each stage may be verified (e.g., validated) by comparison to start and end dates that are reported to the permit databases as previously discussed.

The method of the present disclosure may be performed on more than one well location such that the status of each well location may be monitored concurrently. The status of the one or more well locations may be aggregated in a database 316 (FIG. 6). The status of the one or more well locations may be provided for display to a user at one or more input or output ("I/O") devices/interfaces 318 (FIG. 6). Thus, the method of the present disclosure enables the development of a well database that determines the activity status of one or more well locations in substantially real time. Such database may be queried and output reports containing information relating to the production status of one or more well locations including, but not limited to, the drilling start and end dates and the fracking start and end dates, prior to the drilling status and the fracking status being reported to the permit databases. This significantly reduces the lag of drilling and fracking reports of the publicly available databases. Further, analysts, such as oil and gas commodity traders or investors, may rely on the reports of the present disclosure to estimate the future production of hydrocarbons, to hedge funds, and to otherwise measure the exploration and production status of at least one well owned or operated by at least one company within at least one geographic region in a given period of time. Key performance indicators may be derived from the database including, but not limited to, the average time to drill or frack a given well, the average time between drilling and fracking operations. Other information derivable from the database includes the number of completed and uncompleted wells in a given geographic location, owned or operated by a given company, and/or in a given period of time and the number of drilling and/or fracking crews working in a given geographic location, for a given company, and/or in a given period of time.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "MC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 6 illustrates a block diagram of an example computing device 330 that may be configured to perform one or more of the processes described above. The computing device 330 is communicatively coupled to the databases 304, 306, 308, and 312. The databases 304, 306, 308, and 312 may be stored on a non-transitory computer-readable storage media (device) as previously described herein. As shown by FIG. 8, the computing device 330 can comprise a processor 314, a memory 320, a storage device 322, an I/O interface 318, and a communication interface 324, which may be communicatively coupled by way of a communication infrastructure 326. While an example computing device 330 is shown in FIG. 6, the components illustrated in FIG. 6 are not intended to be limiting. Additional or alternative components may be used in other embodiments. Furthermore, in certain embodiments, the computing device 330 can include fewer components than those shown in FIG. 6. Components of the computing device 330 shown in FIG. 6 will now be described in additional detail.

In one or more embodiments, the processor 314 includes hardware for executing instructions, such as those making up a computer program. As an example, and not by way of limitation, to execute instructions, the processor 314 may retrieve (or fetch) the instructions from an internal register, an internal cache, the memory 320, or the storage device 322 and decode and execute them. In one or more embodiments, the computing device 314 may include one or more internal caches for data, instructions, or addresses. As an example and not by way of limitation, the computing device 314 may include one or more instruction caches, one or more data caches, and one or more translation look aside buffers (TLBs). Instructions in the instruction caches may be copies of instructions in the memory 320 or the storage 806.

The computing device 330 includes memory 320, which is coupled to the processor 314. The memory 320 may be used for storing data, metadata, and programs for execution by the processor(s). The memory 320 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 320 may be internal or distributed memory.

The computing device 330 includes a storage device 322 that includes storage for storing data or instructions. As an example and not by way of limitation, storage device 322 can comprise a non-transitory storage medium described above. The storage device 322 may include a hard disk drive (HDD), a floppy disk drive, flash memory, an optical disc, a magneto-optical disc, magnetic tape, or a Universal Serial Bus (USB) drive or a combination of two or more of these. The storage device 322 may include removable or non-removable (or fixed) media, where appropriate. The storage device 322 may be internal or external to the computing device 330. In one or more embodiments, the storage device 322 is non-volatile, solid-state memory. In other embodiments, the storage device 322 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 330 also includes one or more input or output ("I/O") devices/interfaces 318, which are provided to allow a user to provide input to, receive output from, and otherwise transfer data to and receive data from computing device 330. The I/O devices/interfaces 318 may include a mouse, a keypad or a keyboard, a touch screen, a camera, an optical scanner, network interface, modem, other known I/O devices or a combination of such I/O device/interfaces. The touch screen may be activated with a stylus or a finger.

The I/O devices/interfaces 318 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 318 is configured to provide graphical data to a display for presentation to a user. The graphical data may be representative of one or more graphical user interfaces and/or any other graphical content as may serve a particular implementation.

The computing device 330 can further include a communication interface 328. The communication interface 328 can include hardware, software, or both. The communication interface 328 can provide one or more interfaces for communication (such as, for example, packet-based communication) between the computing device 330 and one or more other computing devices or networks. As an example and not by way of limitation, the communication interface 328 may include a network interface controller (NIC) or network adapter for communicating with an Ethernet or other wire-based network or a wireless MC (WNIC) or wireless adapter for communicating with a wireless network, such as a WI-FI. The computing device 330 can further include a bus. The bus can comprise hardware, software, or both that couples components of computing device 330 to each other.

The foregoing specification is described with reference to specific example embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this invention. Indeed, various modifications of the present disclosure, in addition to those shown and described herein, such as alternative useful combinations of the content features described, may become apparent to those skilled in the art from the description. Such modifications and embodiments are also intended to fall within the scope of the appended claims and legal equivalents.

The invention claimed is:

1. A method for determining a status of a hydrocarbon production site, comprising:
   defining an area about a hydrocarbon well location;
   obtaining a time series of mobile geolocation data for at least one mobile device located within the area about the hydrocarbon well location;
   processing the time series of mobile geolocation data using a recurrent neural network and outputting a probability that the mobile geolocation data is associated with a drilling activity, a probability that the mobile geolocation data is associated with a fracking activity, and a probability that the mobile geolocation data is associated with an absence of drilling activity and fracking activity, wherein processing the time series of mobile geolocation data using the recurrent neural network comprises extracting features representative of the mobile geolocation data in a context layer; and
   categorizing, based on the probabilities, the mobile geolocation data as being associated with one of drilling activity, fracking activity, or absence of drilling activity and fracking activity.

2. The method of claim 1, wherein obtaining a time series of mobile geolocation data of at least one mobile device comprises obtaining a number of mobile devices located within the area about the hydrocarbon well location and an association of the mobile devices with a prior drilling activity, a prior fracking activity, or a prior absence of drilling activity and fracking activity.

3. The method of claim 1, further comprising obtaining a time series of image data depicting the area about the hydrocarbon well location.

4. The method of claim 3, wherein obtaining a time series of image data depicting the area about the hydrocarbon well location comprises obtaining a time series of at least one of radar images and optical images depicting the area about the hydrocarbon well location.

5. The method of claim 3, wherein obtaining a time series of images depicting the area about the hydrocarbon well location comprises obtaining images depicting drilling equipment or depicting fracking equipment.

6. The method of claim 3, wherein processing the mobile geolocation data and outputting the probability further comprises processing the time series of image data with the mobile geolocation data using a machine learning algorithm and outputting a probability that the mobile geolocation data and the time series of image data is associated with a drilling activity, a probability that the mobile geolocation data is associated with a fracking activity, and a probability that the mobile geolocation data is associated with an absence of drilling activity and fracking activity.

7. The method of claim 6, wherein the machine learning algorithm comprises a recurrent neural network.

8. The method of claim 1, further comprising identifying a start date and an end date of at least one of the drilling activity and the fracking activity.

9. The method of claim 1, wherein selecting an area about the hydrocarbon well location comprises selecting a well location from a database of drilling permits.

10. A system for determining a status of a hydrocarbon production site, comprising:
    a memory storing a time series of mobile geolocation data for at least one mobile device located within an area about a hydrocarbon well location; and
    a processor communicatively coupled to the memory and configured to:
    process the time series of mobile geolocation data obtained from the memory using a recurrent neural network, wherein features representative of the mobile geolocation data in a context layer are extracted;
    calculate a probability that the mobile geolocation data is associated with a drilling activity, a probability that the mobile geolocation data is associated with a fracking activity, and a probability that the mobile geolocation data is associated with an absence of drilling activity and fracking activity; and
    categorize the mobile geolocation data as being associated with one of drilling activity, fracking activity, or absence of drilling activity and fracking activity.

* * * * *